United States Patent
Vang et al.

(10) Patent No.: US 12,184,070 B1
(45) Date of Patent: Dec. 31, 2024

(54) CONTROLLING LOCAL GENERATION CAPACITY INDEPENDENTLY OF THE POWER GRID

(71) Applicant: Faith Technologies, Inc., Menasha, WI (US)

(72) Inventors: Der Vang, Germantown, WI (US); Romano Pauli, West Bend, WI (US); Jeffrey Wood, Sussex, WI (US); James Koeppe, Middleton, WI (US); Kevin Dennis, Waukesha, WI (US)

(73) Assignee: Faith Technologies, Inc., Menasha, WI (US)

( * ) Notice: Subject to any disclaimer, the term of this patent is extended or adjusted under 35 U.S.C. 154(b) by 0 days.

(21) Appl. No.: 16/811,624

(22) Filed: Mar. 6, 2020

Related U.S. Application Data

(60) Provisional application No. 62/814,736, filed on Mar. 6, 2019.

(51) Int. Cl.
| | | |
|---|---|---|
| *H02J 1/10* | (2006.01) | |
| *H02J 3/00* | (2006.01) | |
| *H02J 3/38* | (2006.01) | |
| *H02J 7/35* | (2006.01) | |
| *H02J 3/32* | (2006.01) | |

(52) U.S. Cl.
CPC ............... *H02J 3/007* (2020.01); *H02J 3/32* (2013.01); *H02J 3/381* (2013.01); *H02J 2300/24* (2020.01)

(58) Field of Classification Search
CPC .......... H02J 3/007; H02J 3/32; H02J 2300/24; H02J 3/381

USPC .......................................................... 307/29
See application file for complete search history.

(56) References Cited

U.S. PATENT DOCUMENTS

| | | | |
|---|---|---|---|
| 8,008,808 B2 | 8/2011 | Seeker et al. | |
| 10,331,157 B2 | 6/2019 | Dennis et al. | |
| 2010/0181837 A1* | 7/2010 | Seeker | H02J 3/383 307/72 |
| 2012/0049637 A1* | 3/2012 | Teichmann | H02J 3/381 307/82 |
| 2013/0062957 A1* | 3/2013 | Bhavaraju | H02J 3/38 307/82 |
| 2015/0194707 A1* | 7/2015 | Park | H02J 7/007182 429/61 |
| 2017/0033597 A1* | 2/2017 | Garrity | H02J 3/381 |
| 2017/0040887 A1* | 2/2017 | Becattini | H02J 3/383 |
| 2017/0192445 A1* | 7/2017 | Dennis | G05F 1/67 |
| 2018/0054064 A1* | 2/2018 | Narla | H02J 9/061 |

* cited by examiner

*Primary Examiner* — Rexford N Barnie
*Assistant Examiner* — Xuan Ly
(74) *Attorney, Agent, or Firm* — Randall W. Fieldhack

(57) ABSTRACT

A power system connectable to an electric utility grid includes a local bus connected to at least one source of electrical energy; a connection to an electric utility grid; an inverter electrically interposed between the electric utility grid and the local bus, the inverter having an AC side and a DC side; a user-selectable switch electrically connected between the electric utility grid and the inverter, the switch having an open position and a closed position; and a local controller in communication with the inverter and the switch, the local controller configured to selectively open the switch to disconnect the power system from the electric utility grid and to selectively close the switch to reconnect the power system to the electric utility grid.

11 Claims, 4 Drawing Sheets

CONTROLLING LOCAL GENERATION CAPACITY INDEPENDENTLY OF THE POWER GRID

BACKGROUND

The present disclosure relates to energy use and generation, particularly to the use or delivery to a third-party power grid of energy generated by renewable energy resources or extracted from energy previously generated and then locally stored.

Rules and regulations allow an electric utility to control the delivery of power to and from a renewable energy source or locally stored energy and an electric utility grid through an inverter. The utility can also use the inverter for non-generation needs of the electric utility grid, such as power factor correction and modification or support of other characteristics of the alternating current (AC) waveform of the electric utility grid, to maintain stable performance of the electric utility grid. These inverters are known as smart inverters. Underwriters Laboratories (UL) certifies smart inverters under the UL1741 SA standard to ensure the inverters embody software and hardware configured to meet these requirements. As a result, under certain operating conditions of the commercial electric utility grid, the renewable or other generated sources of energy cannot be delivered to a local load via the smart inverter because the smart inverter is in a grid interactive mode of operation.

Typically, local energy grids generate and/or have available stored energy in the form of direct current (DC) electricity. These DC sources are often connected to a local user, such as one or more homes, businesses, or commercial or industrial buildings. These DC sources can also be connected to the electric utility grid through an inverter that receives energy in the form of DC electrical energy and converts it into available AC electrical energy. To reduce the cost of a local DC grid connection to a local AC user, the local user and the electric utility grid are both connected to the AC side of the same inverter.

In short, an inverter connecting a local source of power and electricity must be enabled to prioritize requirements of the electric utility operating the electric utility grid. Such an inverter is capacity limited. Supplying non-revenue reactive or imaginary power to support the electric utility grid reduces the amount of real power the inverter can provide to a local load or user. The smart converter can be considered congested if producing reactive power to meet an electric utility grid demand limits the amount of real power the inverter can provide. Because operation of the smart inverter is tied to the electric utility grid infrastructure and/or operation of the grid, the amount of energy or power actually supplied to the electric utility grid through the smart inverter can be unpredictable based on the present rules as well as expected future changes in electric utility grid connection rules. As a result, a local producer of renewable energy that is tied to the grid through a smart inverter cannot control nor easily predict the delivery of power and energy therefrom to the electric utility grid. This impacts flexibility in the use of the local storage and generation components such as a photovoltaic (PV) array of the local energy producer.

Furthermore, the electric utility grid's stability is affected by the timing and quantity of local sources trying to send energy into the electric utility grid. As more renewable energy is deployed, electric utility grid stability must be maintained, resulting in further requirements to use smart inverters to support the electric utility grid infrastructure. It is expected that these requirements will migrate to other regions as the penetration of renewables increases.

SUMMARY

A system capable of operating in "on grid" and "off grid" modes is provided using the following methodology and components to optimize energy production and usage without impacting the electric utility grid. The local grid operator can choose whether to be connected to the electric utility grid when the electric utility grid, or the electric utility operator, desires to control the inverter connecting the local grid to the electric utility grid to supply non-KW outputs. By disconnecting, the local grid operator can maintain the flexibility of the desired operation of its local electric generation system without interference from the electric utility grid or grid operator. It should be noted that when the system operates in off grid mode the controls defined above are not an issue as there is no interconnection with the utility. Further, it is typical that energy storage (for example, one or more batteries) is required to be integrated with variable energy generation capacity such as PV to establish the constant voltage and frequency required of a local grid when operating in an off-grid mode.

The present disclosure describes a power system connectable to an electric utility grid, the power system including a local bus connected to at least one source of electrical energy; a connection to an electric utility grid; an inverter electrically interposed between the electric utility grid and the local bus, the inverter having an AC side and a DC side; a user-selectable switch electrically connected between the electric utility grid and the inverter, the switch having an open position and a closed position; and a local controller in communication with the inverter and the switch, the local controller configured to selectively open the switch to disconnect the power system from the electric utility grid and to selectively close the switch to reconnect the power system to the electric utility grid.

The present disclosure also describes a method for operating a power system, the method including providing power system having a local bus connected to at least one source of electrical energy and to an electric utility grid, a local load, an inverter electrically interposed between the electric utility grid and the local bus, a user-selectable switch electrically interposed between the electric utility grid and the power system, and a local controller in communication with the inverter, the switch, and the electric utility grid; detecting when an electric utility grid demand for reactive and/or real power limits the ability of the local bus to supply real and/or reactive power to the local load due to inverter congestion; and disconnecting the power system from the electric utility grid to allow the local bus to supply real and/or reactive power to the local load.

The present disclosure further describes a power system connectable to an electric utility grid, the power system including a local bus connected to at least one source of electrical energy; a connection to an electric utility grid; an inverter electrically interposed between the electric utility grid and the local bus, the inverter having an AC side and a DC side and complying with UL 1741 SA, wherein the inverter is configured to transfer active and/or reactive power to/from the electric utility grid; and a user-selectable switch electrically connected between the electric utility grid and the inverter, the switch having an open position and a closed position. The power system also includes a local controller in communication with the inverter and the switch, the local controller configured to selectively open the switch to disconnect the power system from the electric utility grid and to selectively close the switch to reconnect the power system to the electric utility grid, wherein the local controller is subject to the overriding control of the electric utility grid when the switch is in the closed position, and wherein the local controller is configured to operate independently of the electric utility grid when the switch is in the open position.

BRIEF DESCRIPTION OF THE DRAWINGS

So that the manner in which the above-recited features of the present disclosure can be understood in detail, a more particular description of various aspects, briefly summarized above, can be had by reference to the following description and the appended drawings. It is to be noted, however, that the appended drawings illustrate only typical implementations of this disclosure and are therefore not to be considered limiting of its scope, for the present disclosure might admit to other equally effective implementations.

Figure 1:
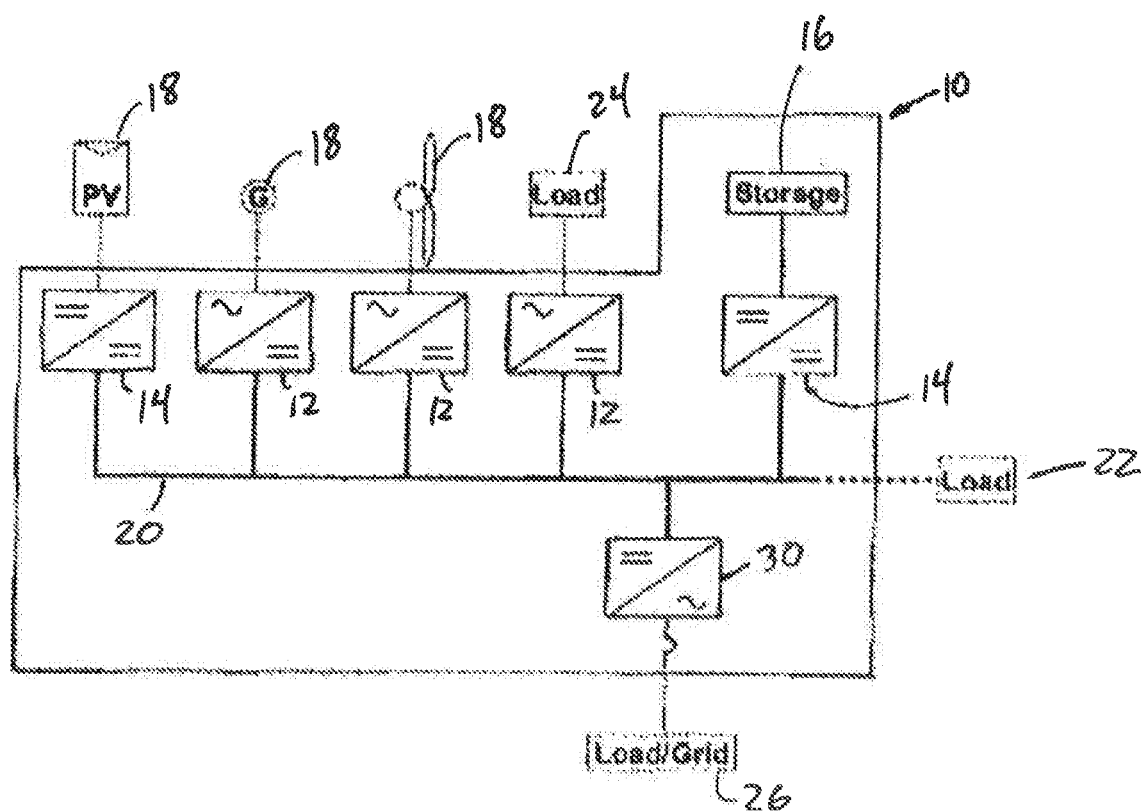
FIG. 1 is a schematic representation of a local generation and storage capacity connected to a load and to an electric utility grid.

To facilitate understanding, identical reference numerals have been used, where possible, to designate identical elements that are common to the figures. It is contemplated that elements and features of one implementation can be beneficially incorporated in other implementations without further recitation.

DETAILED DESCRIPTION

A smart inverter is capable of passing up to a rated amount of power therethrough, as well as being able to receive commands changing the amount of energy or power that can pass therethrough. The capacity of the smart inverter includes the output on the AC side of the smart inverter in terms of real power measured in kW and kWh and imaginary or reactive power measured in kVA and kVAR. A smart inverter certified for interaction with the electric utility grid includes the requirement that an inverter connected to the electric utility grid or operating in the grid following mode has the capability of supporting electric voltage, frequency, or voltage and frequency of AC power on the electric utility grid. Further, if the smart inverter cannot be so used, the amount of power the local grid can supply from the connected generation source (for example, a PV array) must be limited or discontinued. In either scenario, extraction of energy from the local generation source is ultimately curtailed and thus wasted if it cannot be stored on the DC input side of the inverter or otherwise fully used on the DC side of the inverter.

To receive permits to connect a local energy generating source to the electric utility grid, smart inverters must be used. The functionality override embodied in California law and the UL1741 SA standard for interconnection dictates the rules that prioritize the utility needs that in many cases result in the lost production from the local generating source. Lost production is typical where the electric utility grid will not accept the amount of power available for passing into the electric utility grid, local storage on the DC input side of the smart inverter is full and cannot accept more energy for storage, and local user(s) on the DC input side of the inverter cannot consume the total energy being locally generated. Lost production reduces the value of the renewable energy generation system on the local energy producer's side of the smart inverter and also curtails or prevents the use of the production of green or renewable energy.

The following are examples of potential lost production resulting from the connection of a local grid to an electric utility grid using a smart inverter configured to meet the UL1741 SA standard:

Volt/Watt: In this instance, if the electric utility grid voltage reaches an unacceptably high level based on electric utility operation standards, the kW output (the real component as opposed to the reactive component) of the inverter is limited or curtailed regardless of the local generation capacity on the DC input side of the inverter to produce kW. This is due to the fact that the export of more kW would have some impact to further increase the voltage on the electric utility grid.

Volt/VAR: The inverter technology in smart inverters has a capability of producing or absorbing volt-ampere reactive power (VARs) and not watts (real power). Anything up to the inverter's full volt-ampere (VA) capacity is subject to being used for the production of VARs to increase the utility voltage or absorption of VARs to decrease the electric utility grid voltage. When in this operational mode, the electric utility grid voltage can be in a range that requires the entire capacity of the inverter to generate or absorb kVARs. The inverter is thereby unable to pass wattage to the electric utility grid because it is producing only a reactive component of the power it creates by inverting the DC input thereto. Considering that nearly all generating sources are valued by their capability to generate electricity in watts and power in kWh, the electric utility grid's prioritization of the inverter's capacity to support grid performance effectively curtails the use of the local generating source(s) where any local storage on the local side of the inverter is filled, and local use of the generated electricity cannot consume that available. Delivery of power that could be generated from the local generating source(s) is limited by kVAR production or absorption by the smart inverter or prevented entirely from passing through the smart inverter to the electric utility grid. Note that the smart inverter output is based on kVA rating (not kW or kVAR), where the relationship is kVA= $(kW^2+kVar^2)1/2$. As a result, the electric utility grid's imposed priority on the smart inverter for VAR operation will diminish the capability of the inverter to deliver kilowatts available on the DC side of the smart inverter.

Constant Power Factor: Another priority of a smart inverter is to operate in a constant power factor mode as a condition of permitting interconnection of the local energy source to the electric utility grid. Understanding that the Power Factor is a ratio of kw/kVA and requiring the need to use part of the kVA capacity to generate VARs, the capacity of the inverter is reduced for the generation of kW (kWh).

Frequency/Watt: Similar to the Volt/Watt function defined above, resulting in limiting export of energy through the smart inverter to support frequency or reduce frequency variation on the electric utility grid.

Low and High Voltage Ride Thru (LHVRT): During electric utility grid under-voltage events, the system can be required to export power into the electric utility grid for up to 21 seconds. The percent level of export is dependent upon the grid voltage. In other words, the lower the grid voltage the higher the required export. The required export uses a look-up table or a ramp from 0-100%. Up to 21 seconds is an example of a standard condition, and exact details are called out in a utility agreement. The LHVRT acts to regulate or limit the operation of power generation. While the system is grid connected, these utility conditions are required to be met. During this period of time the capacity of the installed system is required to address these rules instead of other operations.

Low and High Frequency Ride Thru (LHFRT): Similarly, to prevent or correct over-frequency and under-frequency events, the system can be required to export power into the electric utility grid for up to 21 seconds. The capacity of the system is required to address the utility conditions as a priority in a manner that overrides system functionality to support the electric utility grid.

Solar ITC: Under certain utility rules, renewable energy including PV and batteries is not to be used for load, but rather to support the electric utility grid. This has impacted the rules that govern tax credits.

HECO Rule 14h: Hawaii Electric Co has a requirement that allows the utility to remotely enable/disable the inverter and to set the functions defined above, including the electric utility owner of the electric utility grid having the right to set the on and off power points of the smart inverter. This means the utility can change the rules and demands on the equipment as they wish to address their primary mission of grid stability, regardless of what the cause of the grid issue is. In other words, all assets must be first used as the grid requires.

A power system of the present disclosure typically includes one or more generating sources and one or more storage options connected to a local bus. The local bus is connected to the DC side, or local generation and storage side, of a smart inverter. The AC or electric utility grid side of the smart inverter is connected independently to both the electric utility grid and to one or more local energy users or loads, such as a home, a building, etc. In this arrangement, energy supplied to the DC side of the smart inverter can be supplied therethrough to the electric utility grid and/or the load. Energy supplied to the AC side of the smart inverter can be supplied therethrough to the DC side and/or directly to the load. In the event, however, that the electric utility grid chooses to curtail the amount of energy passing through the smart inverter, or to control the inverter for voltage or frequency generation, grid stability control, or for other non-feed purposes, real power delivery through the smart inverter can be curtailed or eliminated, thereby also curtailing or eliminating the ability to supply real power from the DC side to the local load. Thus, not only can the electric utility operator of the electric utility grid curtail the passage of kW into the electric utility grid, it also curtails delivery of that power and electricity to the local load on the AC side of the smart inverter.

It should be noted that the system can be configured with a local AC bus having multiple smart inverters behind one meter, for example one for PV, one for battery, etc. and used as described herein.

When the smart inverter is interconnected to the electric utility grid, a local controller monitors the power passing through the point of connection on the AC side of the smart converter to the electric utility grid, and the smart inverter monitors the voltage and the AC frequency at its AC terminals.

When electric utility grid conditions curtail or eliminate the ability to supply energy from the DC side to the local load, a local user or local grid controlled switch operable to selectively connect and disconnect the AC side of the smart converter to the electric utility grid can be used. In this instance, a local load connected to the AC side of the smart converter stays connected, through the smart inverter, to the local generation and storage system. When the utility grid voltage and frequency is within a range that will allow the generating source and smart inverter to operate at their full capacity to deliver kW and kWh into the electric utility grid, the system will remain grid connected.

To be clear, remaining grid connected does not necessarily mean that energy is being delivered to the grid or being received from the grid. The smart inverter could be capable of full output but only producing power that the load/customer is consuming. It is desirable that the utility voltage and frequency parameters are such that the smart inverter is unimpeded by utility rules but instead can be used as intended by the user preference without being overridden. Under various conditions, the system will dynamically operate as follows:

Where the detected electric utility grid conditions are such that power will not be exported to the electric utility grid, and the electric utility grid will control the smart converter to provide non-revenue outputs, such as power factor correction, frequency correction, etc. to the electric utility grid, the local controller provides a kW command to the inverter to only produce enough power for consumption by the local load and thus ultimately zero power flows to the electric utility grid.

Where the detected electric utility grid conditions are such that power can be exported to the electric utility grid, the local controller can generate a kW command to the inverter to allow export of power back to the electric utility grid should that be desired based on current economics of use of the generated power or electricity. This includes situations where the electric utility grid or grid operator is curtailing kW input thereinto by control of the inverter, as well as situations where the electric utility grid or operator is curtailing, but not fully preventing, the production of kW by its control of the inverter to produce and deliver kVARs.

In the case where grid requirements on the smart inverter reach a point that will result in curtailment of supply to a local load, the system will detect the situation based on requirements preset in the smart inverter and send a signal to open a local grid controlled switch located between the electric utility grid and the smart inverter and between the electric utility grid and the local load. Once disconnected from the electric utility grid, the smart inverter then operates in an off-grid mode to supply the connected local load with energy from the local grid. In the event there is insufficient energy stored in the storage and being generated by the generation devices, the local grid controlled switch is controlled to maintain the connection between the smart inverter and the electric utility grid to allow the local load to draw power and electricity from the electric utility grid. In another aspect, a non-renewable generation source is provided, and the local controller can operate to isolate the smart inverter from the electric utility grid, control the local non-renewable source to generate power and electricity, and allow that power and electricity to flow to the local load.

Throughout this description, several terms will be used for describing the power conversion devices used to couple a generating source or load to a common DC bus including: a converter, a regulator, and an inverter. Each of the converter, regulator, and inverter include both a voltage signal and a control unit. The voltage signal indicates the voltage level present on the DC bus and can be generated by individual voltage sensors within each power conversion device, a single voltage sensor providing the signal to multiple power conversion devices, or a combination of voltage sensors providing a signal to individual power conversion devices and to multiple power conversion devices. The control unit of each power conversion device preferably includes a power conversion section, consisting of power electronic devices, a processor capable of executing a program to send control signals to the power electronic devices, and memory for storing the program capable of executing on the processor. The voltage signal is read by the program executing on the processor. The program outputs control signals to the power electronic devices to regulate power flow through the device as described in more detail below. Alternately, the control unit can be made up solely of the power electronic devices and control hardware connected directly to the voltage signal to regulate power flow through the device. For example, a boost converter, as is known in the art, can be used to convert a first DC voltage level to a higher, second DC voltage level.

Referring to FIG. 1, a basic hybrid power system 10 is illustrated. The power system 10 includes at least one converter 12, where each converter 12 is connected to a generating source 18. The power system 10 further includes at least one regulator 14, where each regulator 14 is connected to at least one storage device 16. A common DC bus 20 links each of the converters 12 and the regulators 14. The DC bus 20 can supply DC loads 22, AC loads 24, and can send power to or receive power from an electric utility grid 26.

Each converter 12 is electrically coupled between a generating source 18 and the common DC bus 20. The generating source 18 can be of any type known in the art, including but not limited to wind, PV, hydroelectric, tidal, biofuel, or biomass generating sources. Each of these sources 18 outputs either an AC or a DC voltage with an amplitude suited to the type of generating source 18. The generating source 18 provides an input voltage to the power electronics of the converter 12. The power electronics are configured to convert this input voltage to a desired DC voltage level as an output voltage to the DC bus 20. For example, the desired DC voltage level can be 650 volts if the power system connects to a 460-volt AC load 24 or an AC load/electric utility grid 26. Alternately, the DC voltage level can be any desired DC voltage, such as 48 volts, that can be required by a specific DC load 22. The DC voltage level can similarly be selected to provide optimum energy conversion between a generating source 18 and the DC bus 20.

Each regulator 14 is electrically coupled between a storage device 16 and the common DC bus 20. The storage device 16 can, for example, include a battery, a fuel cell, or a regenerative fuel cell. It is contemplated that each storage device 16 can be made of either a single device or multiple devices connected in series, parallel, or a combination thereof as is known in the art. The power electronics of each regulator 14 are configured to allow bidirectional power flow between the DC bus 20 and the storage device 16. The DC bus 20 operates at a first DC voltage level and the storage device 16 operates at a second DC voltage level. Alternately, the DC bus 20 and the storage device 16 can operate at the same DC voltage level.

The hybrid power system 10 can further include an output power conversion device, for example an inverter 30 or another DC-to-DC converter. The inverter 30 is electrically coupled between the DC bus 20 and an AC load/electric utility grid 26. The AC load can be either independent of or connected to the electric utility grid 26. The power electronics of each inverter 30 can be configured to allow bidirectional power flow between the DC bus 20 and the AC load 26. The bidirectional power flow allows the electric utility grid 26, when connected, to supply power to the DC bus 20, supplementing the power provided by the generating sources 18 if the demand from the loads 22, 24 connected to the power system exceed the power supplied by the generating sources 18. An DC-to-DC converter (not shown) can be electrically coupled between the DC bus 20 and a DC load 22 operating at a different voltage level than the voltage on the DC bus 20. It is contemplated that any number and combination of loads can be connected to the system, such that a load can be connected to the DC bus 20 either directly, through the inverter 30, through a DC-to-DC converter, or any combination or multiple thereof.

Figure 2:
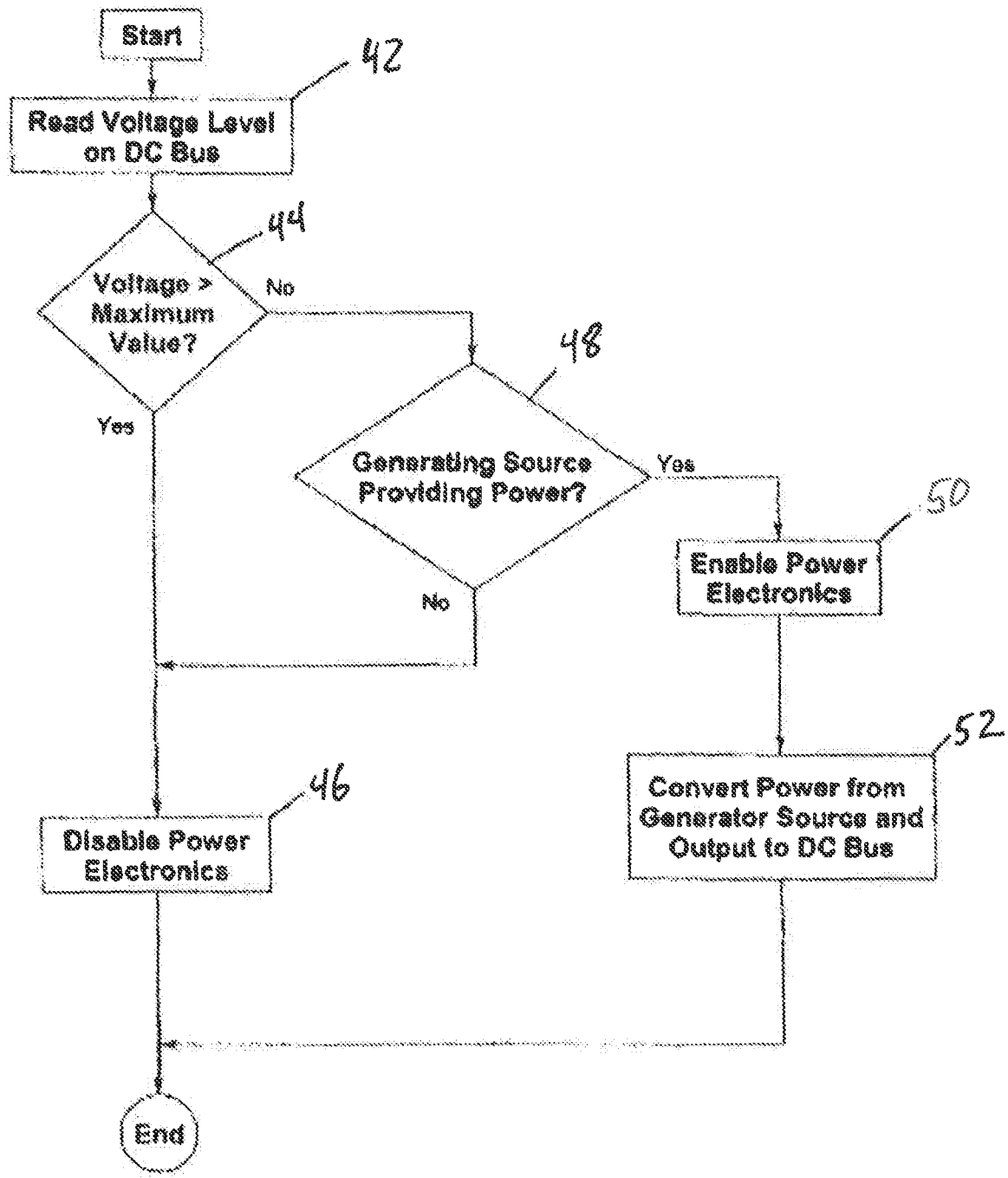
FIG. 2 is a flowchart of the operation of a converter in the system of FIG. 1.

In operation, each converter 12 operates independently of the other converters 12 and regulators 14 to supply power to the DC bus 20 according to the steps illustrated in FIG. 2. In step 42, the converter 12 monitors the voltage signal to determine what DC voltage is present on the DC bus 20. In step 44, the voltage signal is compared against a predetermined maximum value, for example 120% of the desired DC bus voltage level. If the voltage on the DC bus 20 rises above this maximum value, the converter 12 will disable the power electronics, according to step 46, to prevent further power from being input to the system. If the voltage on the DC bus 20 is below the maximum value, the converter 12 is ready to convert energy as provided by the generating source 18. In step 48, the converter 12 monitors the generating source 18 to determine whether it is generating power. If no power is being generated, the power electronics will be disabled, according to step 46, because there is no need to transfer power to the DC bus 20. If power is being generated, the power electronics are enabled to convert the input voltage to the desired DC bus voltage, according to steps 50 and 52. The steps of FIG. 5 are repeated such that the converter 12 is continuously monitoring the voltage on the DC bus 20 and responding appropriately.

By operating each converter 12 independently of the other converters 12 and regulators 14, maximum operating efficiency can be achieved. First, by converting the energy generated by each source 18 onto a common DC bus 20, the power system 10 eliminates the double-conversion process commonly required to convert the generated energy into an AC voltage for connection to the grid. In addition, the voltage level on the DC bus 20 is regulated at a constant value, as described below. This allows the converters 12 to be configured to operate at maximum efficiency. For example, a maximum power point tracking algorithm, as is known in the art, can be executed by the processor in the control unit to provide maximum power transfer to the DC bus 20.

In a similar manner, the regulator 14 operates independently of each of the converters 12 to regulate the voltage level on the DC bus 20. The regulator 14 monitors the level of charge in the storage device 16. The regulator 14 determines whether the storage device 16 is fully charged. If the storage device 16 is fully charged, it is unable to accept further energy from the DC bus 20. If the voltage level on the DC bus 20 exceeds the desired voltage level while the storage device 16 is fully charged, the power electronics are disabled to prevent additional power flow either to or from the storage device 16. If the voltage level on the DC bus 20, however, begins to drop below the desired voltage level and the storage device 16 is fully charged, the power electronics are enabled to transmit energy from the storage device 16 to the DC bus 20 to maintain a constant voltage on the DC bus 20.

The regulator 14, after determining that the storage device 16 is not fully charged, determines whether the storage device 16 is fully discharged. If the voltage level on the DC bus 20 drops below the desired voltage level while the storage device 16 is fully discharged, the power electronics are disabled because the storage device 16 is unable to supply energy to the DC bus 20. If the voltage level on the DC bus 20, however, begins to rise above the desired voltage level and the storage device 16 is fully discharged, the power electronics are enabled to transmit energy from the DC bus 20 to charge the storage device 16 and to maintain a constant voltage on the DC bus 20.

If the regulator 14 determines that the storage device 16 is partially charged, the power electronics are enabled and the regulator 14 operates to maintain a constant voltage level on the DC bus 20. The constant voltage level is maintained by charging the storage device 16 if the voltage level on the DC bus 20 begins to rise and by discharging the storage device 16 if the voltage level on the DC bus 20 begins to drop. These steps are repeated such that the regulator 14 is continuously monitoring the voltage on the DC bus 20 and responding appropriately. In this manner, the regulator 14 and storage device 16 operate to maintain a constant voltage on the DC bus 20. The storage device 16 is preferably sized such that it generally remains in a partially charged state, receiving energy from the DC bus 20 when the generated power exceeds the demands from the loads and supplying energy to the DC bus 20 when the loads demand more energy than is provided by the generating sources 18.

The inverter 30 similarly operates independently of the other power conversion devices. When the power system 10 is connected to a grid-independent AC load, the inverter 30 reacts to the power requested from the load and supplies the appropriate power to the AC output of the inverter 30. When the power system 10 is connected to the utility grid, the inverter 30 maintains a constant voltage and frequency on the AC side of the inverter 30. By maintaining a constant voltage and frequency at the AC side of the inverter 30 when connected to the utility grid, changes in the voltage level on the DC bus 20 will result in power transfer either to or from the utility grid as required. This grid connection can help maintain the DC bus 20 at the desired DC voltage level and can further provide another source of energy to charge the storage device 16.

Figure 3:
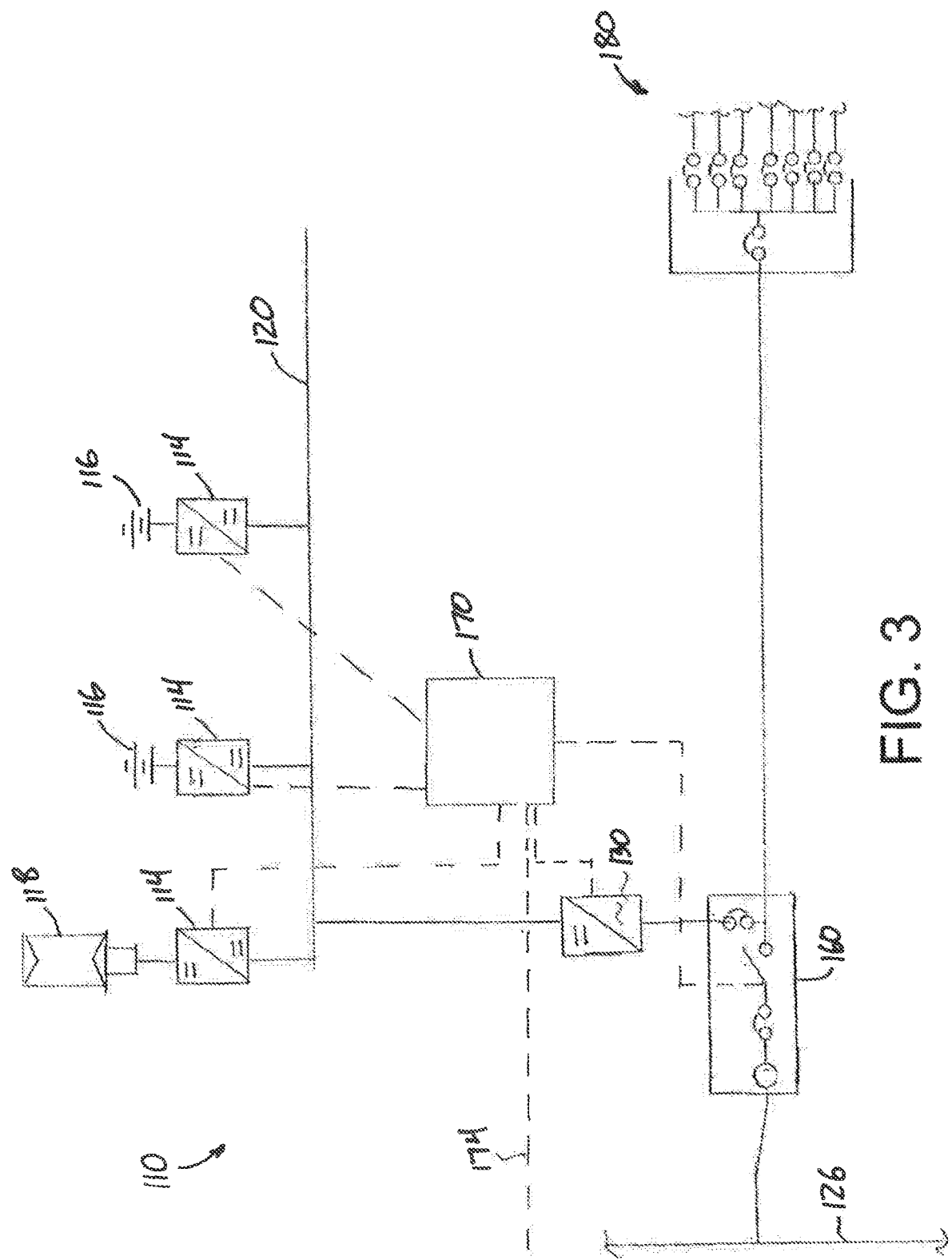
FIG. 3 is a schematic representation of a local generation and storage capacity connected to a load and connectable to the grid through a local grid switch.

In further aspects of the present disclosure, the system 10 as described with respect to FIGS. 1 and 2 is modified to form a local generation, storage, or storage and generation system 110 as shown in FIG. 3. This system 110 can include renewable generation source(s) 118 and storage devices 116, each independently interconnected to a DC bus 120 by regulators 114 dedicated to each interconnection. Generating sources 118 that produce AC power (not shown), such as a generator, would be connected to the DC bus 120 with converter. The DC bus 120 of system 110 is also connected through an inverter 130 to the local side of a local grid-controlled switch 160 and to a local load 180. A local controller 170 is connected, in part, to each of the inverter 130, the voltage converters, the voltage regulators 114, and the storage devices 116. In operation, the local generation, storage, or storage and generation system 110 is monitored by the local controller 170. The system 110, but for the addition of the local grid-controlled switch 160 and the interaction thereof with the local controller 170, operates in the same manner as described previously herein with respect to FIGS. 1 and 2. The renewable generation source(s) 118 is preferably connected to the voltage regulator 114 therefore through a rapid shut down device, which detects the presence of ground faults and arcing, and in the event of arcing or a ground fault being detected, initiates a rapid shutdown of the output of the renewable generation source(s) 118 into the voltage regulator 114 dedicated thereto. Rapid shutdown is a function that disables the renewable generation source(s) 118, for example a PV array, for safety/first responder protection per local electrical codes.

The inverter 130 is a smart inverter complying with the UL 1741SA standard, and is thus configured to allow the electric utility grid 126 or the operator thereof to control the inverter 130 to selectively curtail the generation of electricity in the form of kW (real power) from the DC bus 120 from passing through the inverter 130 and into the electric utility grid 126. Instead, the exchange of power in the form of kVAR (reactive power) is enabled to allow the electric utility grid 126 to use the electrical energy and power generated by the system 110 to help control and stabilize the electric utility grid 126, based on control signals passing between the electric utility grid 126 and the inverter 130, or between the inverter 130 and a secondary communication link 174 such as the internet, with the electric utility grid operator.

The output of kW through the inverter 130 is a function of the vector sum of the real and reactive components, based on its kVA rating (not kW or kVAR) where $kVA=(kW^2+kVAR^2)1/2$. When the electric utility grid 126 or operator thereof controls the inverter 130 to use the reactive power capacity thereof, this will inherently result in a reduction of real power deliverable through the inverter 130 to both the local load 180 and to the electric utility grid 126. Thus, in the event an electric utility grid event occurs that requires reactive power to correct, the reactive component of the inverter 130 is precedentially used based on rules set into the inverter 130 to meet local regulations, which resultantly reduces the amount of kW from the DC bus 120 available to support the needs of the local load 180, as well as for delivery to the electric utility grid 126. In some cases, the curtailment of real power results in zero delivery of power to the local load 180 or the electric utility grid 126, or an amount of power insufficient to support the local load 180. Additionally, where the storage devices 116 of the system 110 are fully charged or cannot accept charge (power to charge them), energy generated by the generation source(s) 118 is wasted because a point will be quickly reached on the DC bus 120 where a maximum voltage thereof is attained and thus will reach the cut-off threshold of the converters and regulators 114.

To limit or eliminate the occurrence of this condition, the local controller 170 is also programmed to receive, as an input from one or more of the inverter 130, the electric utility grid 126, or a communication link 174 with the operator thereof, the temporal/current requirements of the electric utility grid 126 for delivery of reactive power from an inverter connected thereto, or for the curtailment of the receipt of real power by the electric utility grid. Based on user-set variables or conditions and an algorithm stored therein, the local controller 170 selectively controls the setting of the local grid-controlled switch 160.

The local controller 170 is also configured to control the voltage on the DC bus 120 by controlling the operation of the voltage regulators 114 dedicated to the renewable generation capacity 118, the operation of the storage 116, and the operation of the inverter 130. This control is preferably based on the local controller 170 selecting the on or off state of the dedicated voltage regulators 114 and the inverter 130 to maintain the voltage on the DC bus 120 in a set voltage band, such that when the voltage drops, energy is supplied into the DC bus 120 from one or more of the electric utility grid 126 through the inverter 130 and from the renewable generation source 118. When the voltage on the DC bus 120 is increasing, the voltage regulators 114 for the storage(s) 116 are controlled to allow energy to flow from the DC bus 120 into the storage(s) 116, as well as into the electric utility grid 126, the load 180, or both, through the inverter 130.

In other aspects the bus can be an AC bus with the inverter replaced by a voltage regulator and the dedicated voltage regulators replaced by dedicated inverters, all under control of the local controller. This operation and the components thereof are further disclosed in U.S. Pat. No. 8,008,808, which is incorporated herein by reference to the extent it does not conflict herewith.

Based on user settings, the local controller 170 additionally controls the local grid-controlled switch 160 to connect, or not connect, the smart inverter 130 to the electric utility grid 126. When connected to the electric utility grid, the local controller 170 is subject to the overriding control of the electric utility grid 126 or operator thereof, but when disconnected from the electric utility grid 126, it is not subject to that overriding control. Additionally, the local controller 170 continues to receive information from the local utility grid 126 or grid operator being communicated with the inverter 130.

During periods in which the reactive component of the inverter 130 is used for grid stability or the kW output of the inverter 130 is drawn by the electric utility grid 126 for frequency regulation of the electric utility grid 126, the local controller 170 causes the local grid-controlled switch 160 to disconnect the system 110. Such a disconnection allows the system 110 to use the real power capacity of the inverter 130 to supply the local load 180 because reactive power demands from the electric utility grid 126 are eliminated with the disconnection. Based on the user or operator settings of the local controller 170, the point at which the local controller 170 calls for disconnection can be any range of allowable real power exchange into the local utility grid 126 greater than 0 and up to 100% real and 0% reactive power. For example, where the local load 180 has power requirements, the local generation, storage, or storage and generation system 110 has generation and storage capacity able to meet those needs, and the local controller 170 is operating the voltage regulators and inverter 130 to supply those local needs, if the curtailment of the kW output of the inverter 130 drops below the local load requirements, then the local controller 170 will cause the local grid-controlled switch 160 to disconnect the system 110 from the electric utility grid 126, thereby freeing the inverter 130 to produce whatever are the kW needs of the local load.

When demands on the operation of the inverter 130 no longer require the previously-imposed limits on the passage of real power through the inverter 130, the local controller 170 can close the local grid-controlled switch 160 to reconnect the inverter 130 and the local load 180 to the electric utility grid 126. To reconnect the system 110 to the electric utility grid, the inverter 130 synchronizes the phase output thereof to the AC signal comprising the electrical energy of the electric utility grid 126 to enable transfer of power into the grid, consumption of that power by the local load 180, or both.

Figure 4:
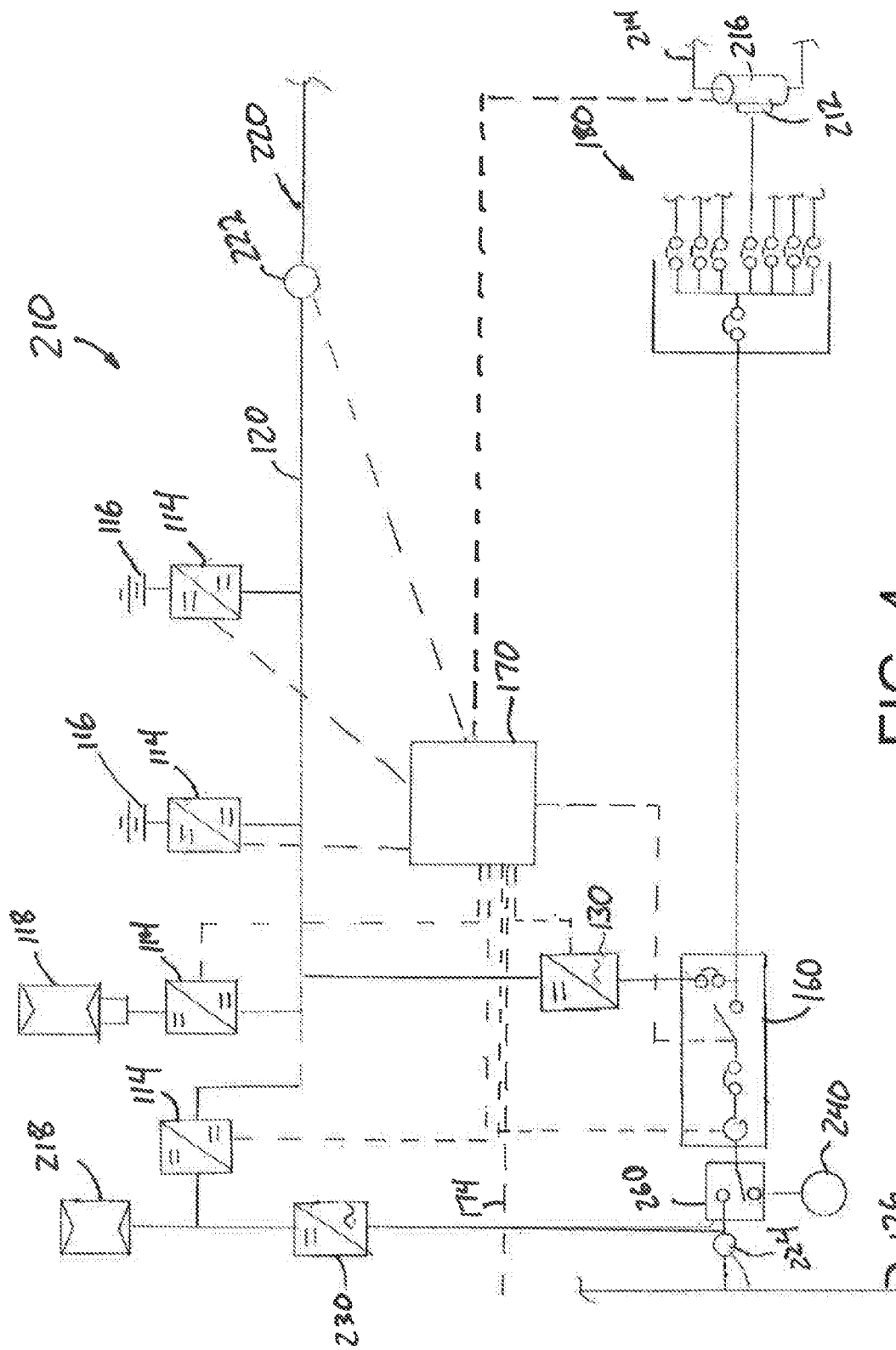
FIG. 4 is a schematic representation of alternative aspects of a local generation and storage capacity connected to a load and connectable to the grid through a local grid switch.

FIG. 4 schematically shows a system 210 combining the features of the system 110 of FIG. 3 with a variety of optional aspects. Maximum flexibility is provided in this manner because the local controller can optimize the use of multiple resources available to it. Such resources include third-party renewably generated resources on bus 220, secondary renewable energy sources 218, and energy stored in a water heater or other thermal mass 216 and storage devices 116. Such resources also include renewable generation capacity 118 and the electric utility grid 126, as well as the ability to sell or transfer energy to and from the bus 220 of an adjacent local consumer through meter 222 (or a switch or DC/DC converter) to bus 220. In addition, the system 210 can also use other information including the cost and sales price of electric power to the system 210 and likely changes in demand by the local load 180 or the electric utility grid 126 or an adjacent local user to locally maximize the financial benefit to the owner or operator of the system 210. The system 210 can also disconnect from the electric utility grid 126 if desired to ensure local control of the generation of real vs reactive power out of the AC side of the inverter 130.

An optional local, non-renewable power source 240 can be employed to add additional power into the system 210 to power local load 180 needs without exporting power to the electric utility grid 126. Local source 240 can be one or more electric generators configured to output electric power in AC, for example diesel or gasoline engine driven generator sets, or a gas turbine generator set, or combinations thereof.

The local generating source 240 is connected to the local grid-controlled switch 160 on the electric utility grid 126 side thereof through a secondary switch 260 configured to, under control of the local controller 170, connect the local generating source 240 to the electric utility grid side of the local grid-controlled switch 160 in a first mode or position. Connection through the first position allows the local load 180, and if desired the storage devices 116, to receive power therefrom and disconnects the electric utility grid 126 from the local grid-controlled switch 160. The secondary switch 260 also includes a second mode or position, wherein the secondary switch 260 connects the local grid-controlled switch 160 to the electric utility grid 126 and disconnects the local generating source 240 from the local grid-controlled switch 160.

The local non-renewable source(s) 240 are configured to maintain a stand-by, non-generating mode when the disconnected from the local grid-controlled switch 160, and to generate electricity when connected to the local grid-controlled switch 160. The local controller 170 can also be configured to control the operation of the local non-renewable sources 240 to cause them to begin generating electricity before or as the local grid-controlled switch 160 is moving to connect the electric utility grid 126 to the local grid-controlled switch 160.

The presence of the local non-renewable source(s) 240 enables enhanced flexibility in the operation of the system 210. For example, during periods of time when the state of charge of the storage devices 116 cannot support the local load 180, or when the storage devices 116 cannot, for other reasons, deliver energy to the local load 180, and the power or energy generated by the renewable generation capacity 118 is insufficient to support the load 180, the user or operator of the system 210 has the flexibility to use the local non-renewable source(s) 240 to support the load, either partially or fully. Additionally, where the electric utility grid 126 is curtailing the generation of real power in kW through the inverter 130, and the state of charge of the storage devices 116 cannot support the local load 180, or when the storage devices 116 cannot, for other reasons, deliver energy to the local load 180, and the power or energy generated by the renewable generation capacity 118 is insufficient to support the local load 180, the local generation capacity 240 can be employed to support the local load 180. Also, where the system does not include local storage, such as storage devices 116, and the power or energy generated by the renewable generation capacity 118 is insufficient to support the load 180, the local generating capacity 240 can be used to supplement the supply of the renewable generation capacity 118 to support the load, in part or in full. This can be done whether or not the electric utility grid 126 is curtailing the generation of real power in kW through the inverter 130.

Although the local generating capacity 240 is shown connected on the grid side of the local grid-controlled switch 160, the local generating capacity 240 can be connected on the inverter side of the local grid-controlled switch 160 through the secondary switch 260. In this case, whenever the local grid-controlled switch 160 is closed to allow a connection to the electric utility grid 126, the local controller 170 will maintain the secondary switch 260 in the open position to isolate the local generating capacity 240 from the electric utility grid 126.

The system 210 can include the ability to exchange electrical energy and power directly from the DC bus 120 to a second DC bus 220 of a different local generation and storage system (not shown) connected to the second DC bus 220 through a meter 222. In this configuration, the second DC bus 220 and second system can be itself connected through a smart inverter thereof to the electric utility grid 126 or can be isolated therefrom. Additionally, power can be supplied or transferred between the buses 120, 220 through the meter 222 such that power on the second grid can be provided into system 210 for storage in storage devices 116 for use to support the needs of load 180, to be transferred directly to the electric utility grid 126 through inverter 130, or combinations thereof, or vice-versa. Settlement of use of power as among the system 210 and second system are settleable, in part by monitoring power passing through the meter 222. This operation and the components thereof are further disclosed in U.S. patent application Ser. No. 16/528,515, which is incorporated herein by reference to the extent it does not conflict herewith.

In another aspect of the present disclosure, a secondary renewable energy source 218, for example a solar electrical generation system, can be connected through an inverter 230 to the electric utility grid 126 and the local grid-controlled switch 160, at a location therebetween. In this configuration, the power or energy generated by the secondary renewable energy source 218 is deliverable through the inverter 230 to both the electric utility grid 126 and the system 210 through the local grid-controlled switch 160, and delivery of power to the electric utility grid 126 is monitored by a secondary meter 224. Additionally, and optionally, the secondary renewable energy source 218 is connectable to the DC bus 120 through a voltage regulator 114 interposed between the secondary renewable energy source 218 and the voltage inverter 230. A meter can be located between the voltage regulator 114 and the DC bus 120 where the secondary renewable energy source 218 is not commonly owned or operated with the system 210, to track exchange of energy therebetween. Additionally, the voltage regulator 114 can be configured to only allow power to pass therethrough into the DC bus 120, and not vice versa. A secondary renewable energy source 218 that produces AC power (not shown), such as a generator, would be connected to the DC bus 120 with converter. This operation and the components thereof are further disclosed in U.S. Pat. No. 10,331,157, which is incorporated herein by reference to the extent it does not conflict herewith.

The system can also include an optional thermal mass 216 such as a residential, commercial, or industrial water heater 216 that forms a part of the local load 180. Here, the water heater 216 is under the control of the local controller 170, and the where excess energy is present on the DC bus 120, the water in the water heater is heated to a temperature greater than its intended use temperature. This is done so as to allow, for example, the renewable generation capacity 118 to continue to generate electricity and deliver it to the bus 120, and through the inverter 130 to the load 180, when state of charge of the storage devices 116 is at capacity or otherwise cannot receive charge, as well as when power export to the electric utility grid 126 is curtailed and the inverter 130 is isolated from the electric utility grid 126 by the local grid-controlled switch 160. This will occur when the local controller 170 detects that the regulators 114 have cut off flow of energy to the storage devices 116, where the regulator 114 is no longer allowing energy to pass from the renewable generation capacity 118, or both. Additionally, a secondary source of fluid 214, here water, at a lower temperature than that exiting the water heater 216, is mixed with the flow exiting the water heater to return the heated water to its use temperature. Additionally, a thermo-electric electrical generating unit 212 is optionally coupled to the water heater 216 to generate electrical energy based on a difference in temperature thereacross. Electrical energy generated by the thermo-electric electrical generating unit 212 is deliverable to the DC bus through a converter or regulator electrically connected therebetween. The decision to increase the fluid temperature in the water heater 216 or other reservoir to a level greater that the intended use temperature is controlled by the local controller 170, and thus the local storage, in this case the water heater, can absorb excess energy generated by the renewable generation capacity 118 that cannot be stored or sold into the electric utility grid 126, or where it is economically expedient to use the excess to heat the water in the water heater using the renewably generated power as opposed to selling it into the electric utility grid 126. Additionally, the ability to recover at least some of the heat energy supplied to the fluid using the thermo-electric electrical generating unit 212 adds even greater flexibility. This operation and the components thereof are further disclosed in U.S. patent application Ser. No. 16/786,328, which is incorporated herein by reference to the extent it does not conflict herewith.

In summary, the use of the controllable switch and the inverter to control connection to an electric utility grid allow the full capacity of the renewable generation to be achieved. The full value of the renewable energy system is restored and outside influences such as utility smart inverter requirements or other future restrictions can be overcome to assure system production is maximized at all times.

It should be understood that the present disclosure is not limited in its application to the details of construction and arrangements of the components set forth herein. The present disclosure is capable of other aspects and of being practiced or earned out in various ways. Variations and modifications of the foregoing are within the scope of the present disclosure. It also being understood that the present disclosure disclosed and defined herein extends to all alternative combinations of two or more of the individual features mentioned or evident from the text and/or drawings. All of these different combinations constitute various alternative aspects of the present disclosure. The aspects described herein explain the best modes known for practicing the present disclosure and will enable others skilled in the art to use the present disclosure.

When introducing elements of the present disclosure or exemplary aspects or implementation(s) thereof, the articles "a," "an," "the," and "said" are intended to mean that there are one or more of the elements. The terms "comprising," "including," and "having" are intended to be inclusive and mean that there can be additional elements other than the listed elements.

While the foregoing is directed to implementations of the present disclosure, other and further implementations of the present disclosure can be devised without departing from the basic scope thereof, and the scope thereof is determined by the claims that follow.

What is claimed is:

1. A power system connectable to an electric utility grid, comprising:
   a local bus connected to at least one source of electrical energy;
   a local load connected to the local bus;
   a connection from the local bus to an electric utility grid;
   an inverter electrically interposed between the electric utility grid and the local bus, the inverter having an AC side and a DC side and configured to transfer real and reactive power to or from the electric utility grid when demanded by the electric utility grid;
   a controllable isolation switch electrically connected between the electric utility grid and the inverter, the controllable isolation switch having an open position and a closed position; and
   a local controller in communication with the inverter and the controllable isolation switch, the local controller and/or inverter configured to detect an electric utility grid demand for the inverter to supply reactive power to the electric utility grid, the local controller configured to selectively open the controllable isolation switch to disconnect the power system from the electric utility grid when the electric utility grid demand for reactive power limits the ability of the local bus to supply real and/or reactive power to the local load due to inverter congestion and to selectively close the controllable isolation switch to reconnect the power system to the electric utility grid, wherein the local controller is subject to the overriding control of the electric utility grid when the controllable isolation switch is in the closed position, and wherein the local controller is configured to operate independently of the electric utility grid when the controllable isolation switch is in the open position.

2. The power system of claim 1, wherein the local controller is configured to obtain electrical energy from an alternative source of electrical energy when the controllable isolation switch is in the open position and the source of electrical energy is insufficient to supply electrical energy to the local load.

3. The power system of claim 1, wherein the local controller is configured to open and close the controllable isolation switch to maintain the capacity of the inverter to transfer electrical energy to the local load.

4. The power system of claim 1, wherein the source of electrical energy is an electrical energy storage device.

5. The power system of claim 1, wherein the source of electrical energy is an electrical energy generation device.

6. The power system of claim 1, wherein the inverter is configured to follow the voltage and frequency reference of the electric utility grid when the controllable isolation switch is in the closed position.

7. The power system of claim 1, wherein the local controller is in communication with the electric utility grid.

8. The power system of claim 1, wherein disconnecting the power system from the electric utility grid prevents supplying real and/or reactive power to the electric utility grid.

9. The power system of claim 1, wherein the local controller is configured to determine whether it is more economically efficient to supply real and/or reactive power to the local load from the electric utility grid or to disconnect from the electric utility grid to allow the local bus to supply real and/or reactive power to the local load.

10. The power system of claim 1, wherein the local controller is configured to monitor the local load, an output of the source of electrical energy, and the electric utility grid demand for reactive power to be supplied to the electric utility grid.

11. The power system of claim 1, wherein the local controller is configured to open the controllable isolation switch when the electric utility grid demand for reactive power creates an adverse economic impact on the power system.

* * * * *